(12) United States Patent
Reynolds

(10) Patent No.: US 6,591,831 B2
(45) Date of Patent: Jul. 15, 2003

(54) COLLAPSIBLE AND MOBILE CHAFING SYSTEM

(76) Inventor: Patrick Allen Reynolds, 505 Porter St., Glendale, CA (US) 91205

( * ) Notice: Subject to any disclaimer, the term of this patent is extended or adjusted under 35 U.S.C. 154(b) by 0 days.

(21) Appl. No.: 09/922,381

(22) Filed: Aug. 3, 2001

(65) Prior Publication Data

US 2002/0020304 A1 Feb. 21, 2002

Related U.S. Application Data

(60) Provisional application No. 60/225,153, filed on Aug. 14, 2000.

(51) Int. Cl.⁷ ............................. F24B 4/02; F24C 5/20; A47B 3/02
(52) U.S. Cl. ..................... 126/33; 126/43; 126/268; 108/26; 108/118; 296/22
(58) Field of Search ............................ 126/33, 43, 261, 126/268; 108/26, 50.13, 116, 119; 296/22; F24B 9/02; F24C 5/20; A47B 3/02

(56) References Cited

U.S. PATENT DOCUMENTS

| 1,464,889 | A | * | 8/1923 | Stirn ............................. 126/33 |
| 2,024,259 | A | * | 12/1935 | Troeber et al. ................. 126/33 |
| 2,471,420 | A | * | 5/1949 | Elkin ............................. 126/33 |
| 2,520,543 | A | * | 8/1950 | Hawkins ........................ 296/22 |
| 4,739,580 | A | * | 4/1988 | Simmons et al. ............. 126/261 |
| 2002/0043259 | A1 | * | 4/2002 | Brennan ...................... 126/268 |

* cited by examiner

Primary Examiner—Henry Bennett
Assistant Examiner—James G. Barrow
(74) Attorney, Agent, or Firm—Kelly Bäuersfeld Lowry & Kelley, LLP

(57) ABSTRACT

A portable and collapsible chafing system includes a frame forming a well configured to hold a chafing container. Underlying the frame is a heating device holder in the form of a platform pivotally connected to the frame. The chafing system includes legs pivotally connected to the frame for movement between a first collapsed position and a second position in which legs extend from and elevate the frame. Wheels are associated with each leg to render the system mobile.

18 Claims, 4 Drawing Sheets

COLLAPSIBLE AND MOBILE CHAFING SYSTEM

RELATED APPLICATION

This application claims priority from provisional application Ser. No. 60/225,153, filed Aug. 14, 2000.

BACKGROUND OF THE INVENTION

The present invention generally relates to chafing pans, tables and burners used in the restaurant and catering businesses. More particularly, the present invention relates to a chafing system which can accommodate multiple chafing pans during use as well as being portable and collapsible so as to be used by as few as one worker.

Traditionally, the way food is cooked, warmed or served at most catered events (i.e., weddings, banquets, film and television location shoots, etc.) is by setting chafing dishes on tabletops of typically six foot or four foot banquet tables. The chafing pan is suspended in a wire frame above a heat source, such as gas hotplates or Sterno liquid fuel wick burners.

This set up often requires two or more people to bring in and set up the tables, the chafing pans and the fuel. In addition to being labor intensive and time consuming, this method seldom utilizes good economy of space. It can also be hazardous to safety, as the heat source is often in close proximity to wooden table tops, and wind can spill the liquid fuel onto flammable surfaces. This becomes especially evident at large events where there is a high volume of food being served and quick recovery is a premium.

One existing alternative is a rigid steam table or cooking system that does not break down for transport. Such fixed steam tables are suitable perhaps to temporarily expand the capacity in a permanent facility such as a hotel, restaurant, banquet facility, etc., but the size and weight of such devices preclude portability, even when including castors.

Accordingly, what is needed is a system which allows as few as one worker to set up the necessary chafing pans and fuel. What is also needed is such a chafing system which is portable. What is further needed is a chafing system which is collapsible so as to occupy little storage space and facilitate transportation. The present invention fulfils these needs and provides other related advantages.

SUMMARY OF THE INVENTION

The present invention resides in a portable and collapsible chafing system. This system generally comprises a cart for cooking, warming and serving food. The chafing system includes a frame forming wells configured to hold a chafing container and having a working surface adjacent to the wells. Underlying the frame is a heating device holder, which is typically comprised of a platform. The platform is pivotally connected to the frame and has an aperture that can be used as a handle.

The chafing system also includes legs pivotally connected to the frame for movement between a first collapsed position and a second position in which the legs extend from and elevate the frame. The legs of the chafing system include two pairs of legs, each pair having first and second supports pivotally attached to one another intermediate ends thereof, and each pivotally attached to the frame at an upper end thereof. Each pair of legs also includes a spring interconnected between the first and second supports, which facilitates the raising and collapsing of the system.

Wheels are associated with each pair of legs to provide mobility to the chafing system. In a particularly preferred embodiment, wheel-bearing axles extend between each pair of legs.

The chafing system also includes side and front panels which are pivotally attached to an edge of the frame so as to be movable between an open and closed position.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
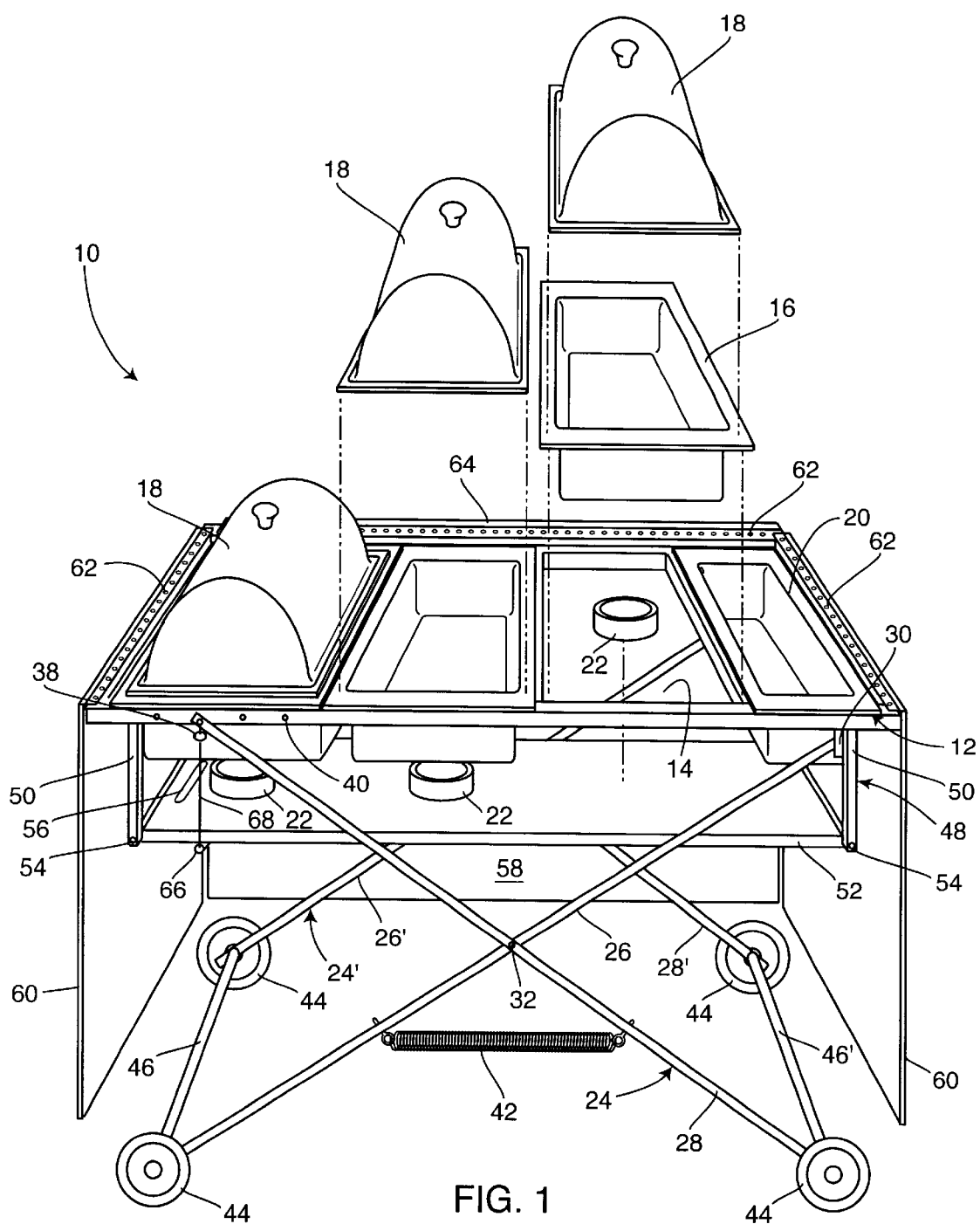
FIG. 1 is a partially exploded perspective view of a chafing system embodying the present invention and accessories therewith.

As shown in the drawings for purposes of illustration, the present invention is concerned with a portable and collapsible chafing system generally illustrated in FIGS. 1–4 and referred to by the reference number 10.

Figure 4:
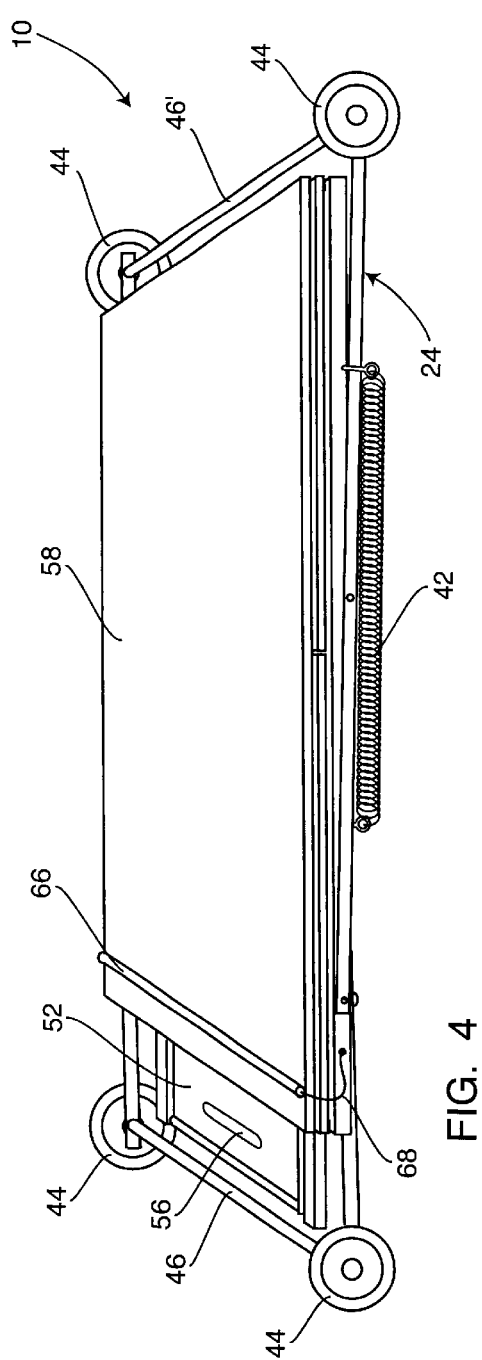
FIG. 4 is a perspective view of the chafing system of FIG. 2 in its collapsed position.

With reference to FIG. 1, the chafing system 10 of the present invention is a cart for cooking, warming and serving catered foods. The chafing system is comprised of a frame 12 that has a plurality of wells 14 configured to receive a pan 16 with accompanying lid 18 or a quarter pan or cutting board/work surface area 20, and can be used with propane hot plate burners or Sterno wick burners 22. The frame 12 preferably has four wells 14 and is rectangular, such as 22" wide by 49" long, and made of metal, such as 18-gauge (0.049) 1"×1" OD stainless steel or flatstock. As illustrated in FIG. 4, the entire chafing system 10 collapses to a compact and portable unit.

Figure 2:
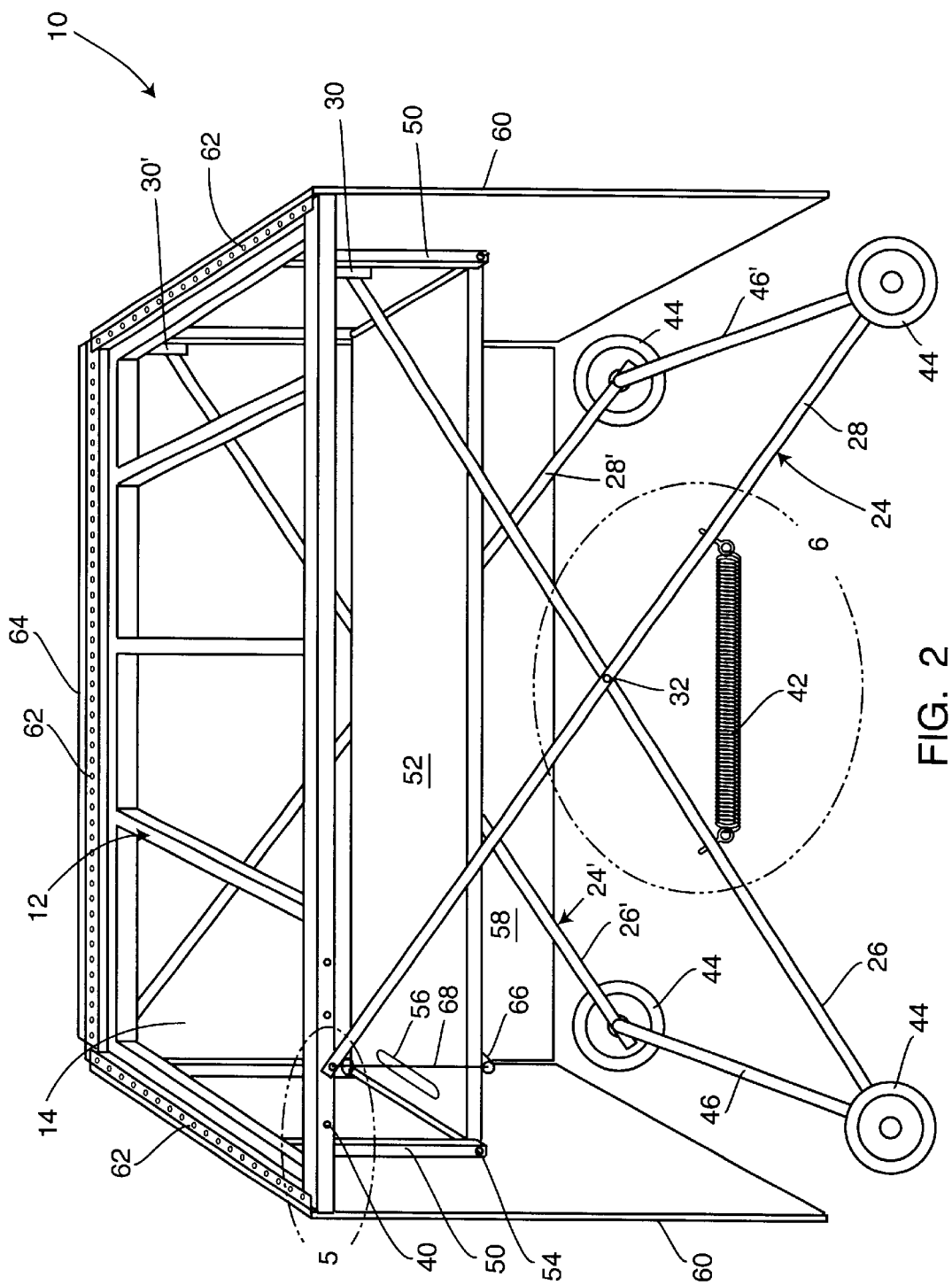
FIG. 2 is a perspective view of the chafing system of FIG. 1.

Referring now to FIGS. 1 and 2, the chafing system 10 has first and second pairs of legs 24 and 24', each having, respectively, a first support 26, 26' and a second support 28, 28'. The supports 26 and 28 of the first pair of legs 24 are substantially equal to the supports 26' and 28' of the second pair of legs 24'. The first supports 26, 26' are pivotally attached to the frame 12 through an axle (not shown), which is connected to the frame 12 through brackets 30 and 30' configured to pivotally hold the axle. The second supports 28, 28' are pivotally attached to the frame 12 and are also attached to the first supports 26, 26' intermediate ends thereof via an axle bolt 32. In a particularly preferred embodiment, the supports 26, 26' and 28, 28' are 1"×1" OD 18-gauge stainless steel and the first supports 26, 26' are approximately 58" long while the second supports 28, 28' are approximately 59" long.

Figure 5:
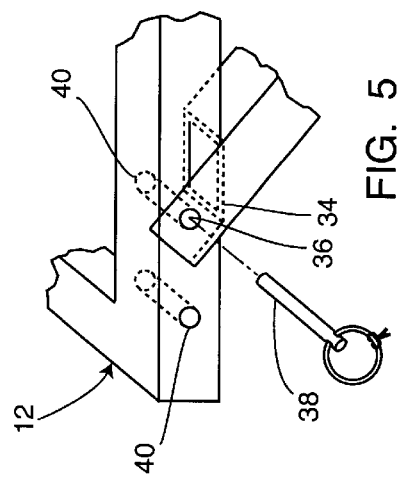
FIG. 5 is an enlarged fragmented perspective view of area "5" of FIG. 2, illustrating the connection between a frame and a second support of the chafing system.

Referring now to FIG. 5, the top 34 of the second supports 28, 28' are notched and beveled, and have holes 36 for the insertion of a pin 38, such as a cotterless hitchpin. The second supports 28, 28' are attached to the frame 12 by inserting the cotterless hitchpins 38 into the holes 36 of the second supports 28, 28' and then through frame holes 40 thereby assembling the chafing system 10. The supports 28, 28' can also be designed to flex around the frame and automatically lock in place followed by the insertion of a pin 38 for safety purposes. The frame 12 may have multiple holes 40 whereby the second supports 28, 28' can be attached nearer or further from the end of the frame 12, allowing the chafing system 10 to be assembled to different heights.

Figure 3:
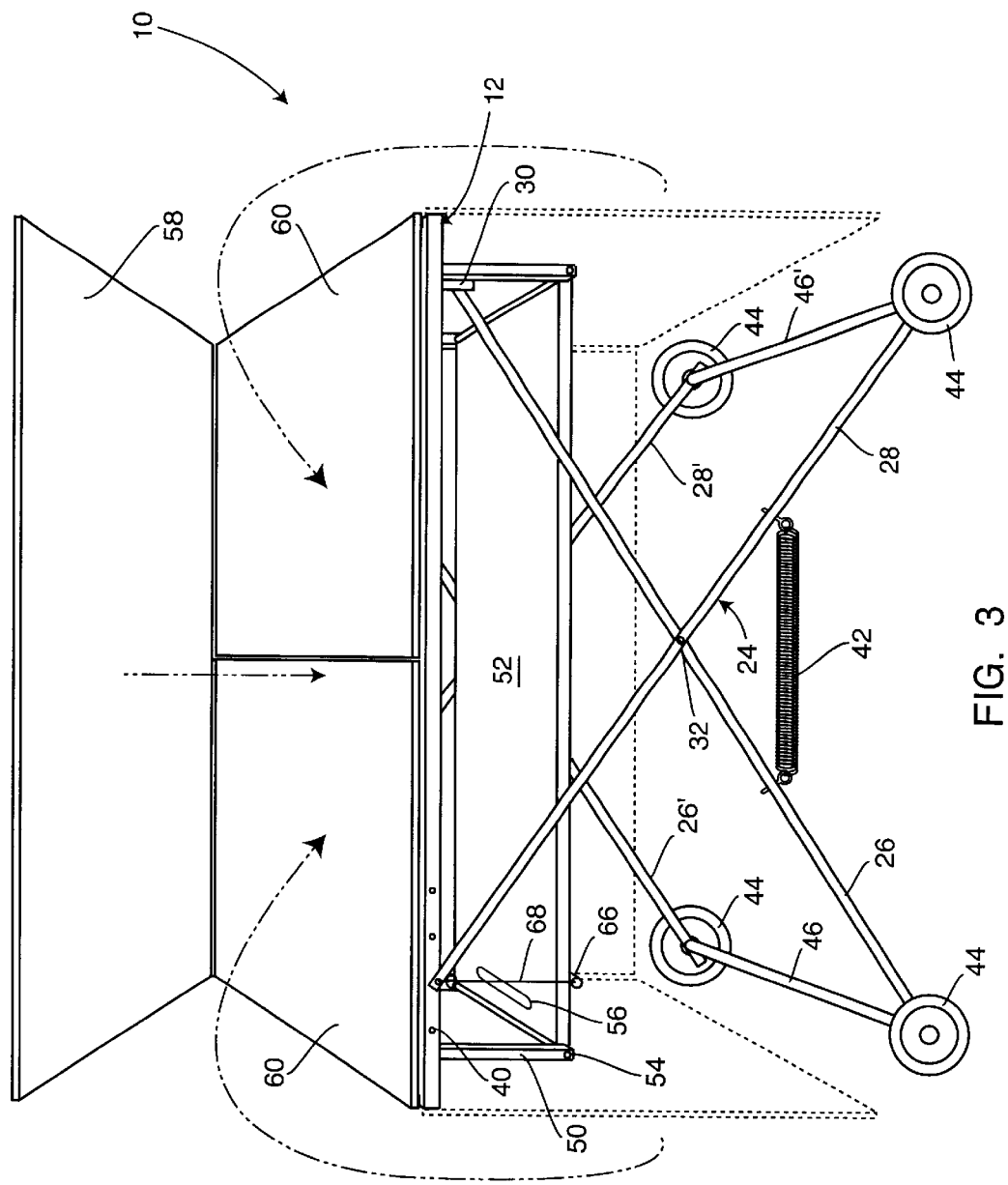
FIG. 3 is a perspective view of the chafing system of FIG. 2 showing its panels in the closed and partially closed position.
Figure 6:
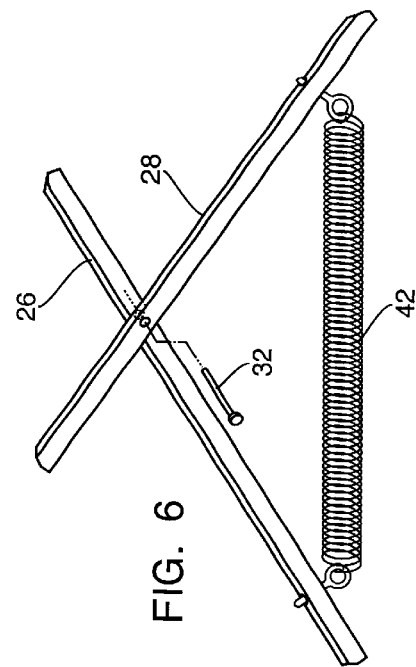
FIG. 6 is an enlarged fragmented perspective view of area "6" of FIG. 2, illustrating a spring interconnecting first and second supports of a pair of legs of the chafing system.

Referring now to FIGS. 3 and 6, each pair of legs 24 and 24' has a spring 42 which connects the first and second supports 26, 26' and 28, 28' at points below the axle bolt 32. The length and placement of the spring is such that the spring applies a contracting force between the supports 26, 26' and 28, 28'. The force applied by the springs 42 assists in the assembly of the chafing system 10 by pulling the lower half of the first and second supports 26, 26' and 28, 28' together. The spring 42 is preferably 12" long and made from heavy-duty galvanized steel.

As shown in FIGS. 1–4, each of the supports 26, 26' and 28, 28' has a wheel 44 associated therewith. Axles 46 and 46' are interconnected between lower ends of supports 26, 26' and 28, 28'. The axles 46 and 46' are preferably covered with a 3/4" OD plastic sleeve and are 29" long. Additionally, the pairs of legs 24 and 24' could be reinforced by interconnecting the pairs of legs 24 and 24' with an X-brace or the like.

Referring back to FIGS. 1–2, a heating device holder 48 is comprised of four platform supports 50 and a platform 52, which is preferably made of a 22-gauge galvanized flashing sheet. The platform supports 50 pivotally connect to the platform 52 through axles 54 attached to the ends thereof. The upper end of platform supports 50 are pivotally connected to an end of the frame 12 through the axle attached to the brackets 30 and 30'. Another end of the platform 52 is pivotally connected to the frame 12 through a similar axle configuration. Such a configuration allows the heating device holder 48 to fold flat when the chafing system 10 is collapsed. The platform 52 preferably includes a cutout 56 which acts as a handle when the chafing system 10 is in the folded position.

Referring to FIGS. 2–3, a front panel 58 and two side panels 60 cover the front and sides of the chafing system 10 to provide aesthetic appeal and which can also serve to cover wells 14. The panels 58 and 60 connect to the frame 12 through hinges 62. The panels 58 and 60 are preferably made of 22-gauge quilted stainless steel and welded to the piano hinges 62 which are preferably riveted to the frame 12. To allow the front panel 58 enough distance from the structural hardware to hang vertically when assembled, the front panel 58 is connected at its top to a strip 64, which is riveted or otherwise connected to the frame 12. While specific dimensions and material specifications have been given to describe the preferred embodiment, the present invention contemplates using different dimensions and materials.

FIG. 1 shows the chafing system 10 in its fully erected state in use. To disassemble the chafing system 10, the pans 16, lids 18, and heating devices 22 are removed. The panels 58 and 60 are then closed by folding them over on top of the frame 12 as shown in FIG. 3. The chafing system 10 is unlocked from its erect position by removing the cotterless hitchpins 38 from the second supports 28, 28'. While the cotterless hitchpins 38 are removed, the chafing system 10 can be held up with an assembly handle 66. The assembly handle 66 is attached to the second supports 28, 28' via cables 68 and can be used to raise or lower the chafing system 10. Other configurations, such as hinged flatstak, can also be employed to create the handle 66. Once the chafing device 10 is lowered to its completely collapsed position, the cotterless hitchpins 38 are again placed through the supports 28, 28' to lock the chafing system 10 in its collapsed position, as shown in FIG. 4. In the particularly preferred embodiment, the fully collapsed chafing system 10 is approximately 2½" high by 22" wide by 58" long, and 65 lbs. It is contemplated that the frame 12 include opposing apertures so that a dolly nose plate and wheel (not shown) can be removably attached to the collapsed system 10 to act as a two-hand dolly for facile transport of pans, etc.

The chafing system 10 is erected by unlocking the second supports 28, 28' and pulling on the assembly handle 66 until the chafing system 10 is in an upright position whereupon the second supports 28, 28' are locked in place.

The chafing system 10 of the present invention is a safe, efficient, and portable device for heating and warming foods at catering events. Use of the chafing system 10 is advantageous because it only requires one person to transport, assemble, and position it in its required place. The same worker, or more if necessary, can then place the necessary heating devices 22, pans 16 of food, and lids 18 to provide the desired service. The compactness of the chafing system 10 in its collapsed state also provides the benefit of saving storage space and making transport easier.

Although an embodiment has been described in detail for purposes of illustration, various modifications may be made without departing from the scope and spirit of the invention. Accordingly, the invention is not to be limited, except as by the appended claims.

What is claimed:

1. A chafing system, comprising:
   a frame forming at least one well configured to hold a chafing container;
   a heating device holder underlying the frame; and
   legs pivotally connected to the frame for movement between a first, collapsed position and a second position in which the legs extend from and elevate the frame, wherein the legs include two pairs of legs, each pair having first and second supports pivotally attached to one another intermediate ends thereof and pivotally attached to the frame at an upper end thereof.

2. The chafing system of claim 1, wherein each pair of legs includes a spring interconnected between the first and second supports.

3. The chafing system of claim 1, wherein each support has a wheel associated with a lower end thereof.

4. The chafing system of claim 1, including wheel-bearing axles extending between each pair of legs.

5. A chafing system, comprising:
   a frame forming at least one well configured to hold a chafing container;
   a heating device holder underlying the frame, wherein the heating device holder comprises a platform pivotally connected to the frame; and
   legs pivotally connected to the frame for movement between a first, collapsed position and a second position in which the legs extend from and elevate the frame.

6. The chafing system of claim 5, wherein the platform includes an aperture configured to be used as a handle.

7. The chafing system of claim 1, including a panel pivotally attached to an edge of the frame and movable between an open position and a closed position.

8. A chafing system, comprising:

a frame forming at least one well configured to hold a chafing container;

a heating device holder comprising a platform pivotally connected to and underlying the frame;

legs pivotally connected to the frame for movement between a first, collapsed position and a second position in which the legs extend from and elevate the frame; and a wheel associated with a lower end of each leg.

9. The chafing system of claim 8, wherein the platform includes an aperture configured to be used as a handle.

10. The chafing system of claim 8, including a panel pivotally attached to an edge of the frame and movable between an open position and a closed position.

11. The chafing system of claim 8, wherein the frame includes a work surface adjacent to the at least one well.

12. The chafing system of claim 8, wherein the legs include two pairs of legs, each pair of legs having first and second supports pivotally attached to one another intermediate ends thereof and pivotally attached to the frame at an upper end thereof.

13. The chafing system of claim 12, wherein each pair of legs includes a spring interconnected between the first and second supports.

14. The chafing system of claim 12, including wheel-bearing axles extending between each pair of legs.

15. A chafing system, comprising:

a frame forming at least one well configured to hold a chafing container;

a heating device holder comprising a platform pivotally connected to and underlying the frame;

legs pivotally connected to the frame for movement between a first, collapsed position and a second position in which the legs extend from and elevate the frame, wherein the legs include two pairs of legs, each pair of legs having first and second supports pivotally attached to one another intermediate ends thereof and pivotally attached to the frame at an upper end thereof; and wheel-bearing axles extending between each pair of legs.

16. The chafing system of claim 15, wherein each pair of legs includes a spring interconnected between the first and second supports.

17. The chafing system of claim 15, wherein the platform includes an aperture configured to be used as a handle.

18. The chafing system of claim 15, including a panel pivotally attached to an edge of the frame and movable between an open position and a closed position.

* * * * *